United States Patent [19]

Schuh

[11] 3,892,353

[45] July 1, 1975

[54] SLIDE RULE

[76] Inventor: Charles H. Schuh, 430 Appian Way N.E., St. Petersburg, Fla. 33704

[22] Filed: Aug. 3, 1972

[21] Appl. No.: 277,793

[52] U.S. Cl. ............... 235/64; 235/70 D; 161/118; 161/139; 161/413
[51] Int. Cl. .............................................. G06g 1/02
[58] Field of Search .......... 161/250, 118, 413, 216, 161/139, 252; 235/64, 70 D, 87 A; 156/196, 245; 264/246; 284/171, 172, 173

[56] References Cited
UNITED STATES PATENTS

| | | | |
|---|---|---|---|
| 1,774,177 | 8/1930 | Harris | 235/64 |
| 2,740,742 | 4/1956 | Vaughan | 161/250 |
| 2,777,636 | 1/1957 | Weiser | 235/64 |
| 3,147,915 | 9/1964 | Cresswell, Jr. | 235/64 |
| 3,261,548 | 7/1966 | Riehle | 235/70 D |
| 3,378,195 | 4/1968 | Schuh | 235/64 |
| 3,493,458 | 2/1970 | Santangelo | 161/118 |
| 3,508,944 | 4/1970 | Henderson et al. | 161/252 |
| 3,568,923 | 3/1971 | Chapman | 235/70 D |
| 3,669,692 | 6/1972 | Turbak | 161/216 |
| 3,783,067 | 1/1974 | Petzetakis | 161/252 |

*Primary Examiner*—William J. Van Balen
*Assistant Examiner*—Stanley S. Silverman

[57] ABSTRACT

The improvement in a multi-scale slide rule pen which comprises the use of a dimensionally stable, creep free, delamination free, post molded, printed, continuous thermoplastic laminate as the surface layer covering the pen.

3 Claims, No Drawings

SLIDE RULE

This invention relates to an improvement in a multi-scale slide rule pen such as is described in my U.S. Pat. No. 3,378,195 issued Apr. 16th 1968, in which, a "Post molded, thermoplastic encased, printed paper laminate," of circular cross section covers the surface of a writing pen, said laminate being in the form of two longitudinal strips, one attached to the pen and a wider one that slides along the pen. The slide extends more than half way around the pen and clings to the pen by a spring like action resulting from its internal diameter being smaller than the outside diameter of the pen. The intensity of this springlike action controls the sliding resistance and must therefore remain constant to assure continued, satisfactory slide rule operation. This is very important for a professional quality slide rule.

This invention relates specifically to said encased laminate and nothing else.

Although the above described thermoplastic encased, printed paper laminate has proved generally satisfactory there are certain disadvantages to this particular laminate, particularly for large commercial production. These disadvantages are threefold.

1. The encased laminate requires two cutting apart and trimming operations for its production, one for the multi-printed sheet and one for the multi-laminated sheet. The latter may not be die cut since the small strips can not be accurately placed in the laminating press. This results in much labor and difficult handling of numerous small strips in laminating and trimming so as to allow for very narrow, clear encasing edges around each laminate strip.

2. I have found that there is a tendency for small narrow strips to become distorted in laminating and that this tendency increases with the narrowness of the strip. This was not known in the laminating industry since very small strips (only ¼ inch wide) had not been laminated previously. the result is that a percentage of rejects can be expected and this could become a serious problem in volume production.

3. The clear plastic edges of the encased laminate strip could be much better utilized by a slightly greater scale width with no encasing edge, particularly in an eleven scale slide rule pen.

I have found that the above disadvantages can all be eliminated by using what I call a continuous laminate. The term continuous laminate, as herein used is defined as a laminate in which each of the component laminate sheets that are laminated to-gether extend to the very edge of the finished laminate. As opposed to this, the encased laminate has clear surface overlay sheets extending beyond the opague printed core sheet so as to encase the core sheet, and leave a clear edge around each laminate strip.

Obviously, in multi-laminating small strips to be encased the strips much first be accurately trimmed or die cut and then laid between two clear thermoplastic sheets with enough space between them to allow for the encasing edges of each strip plus some waste space for cutting and trimming. On the other hand, with the continuous laminate large sheets can be multi-printed with no waste space between the prints, the prints all being accurately alligned. The whole sheet is then laminated directly and only the laminated sheet is die cut into the laminate strips ready for molding.

Generally speaking, the core sheet of the laminate carries the printing and the overlay surface sheets are clear thermoplastic sheets. I have found that other core sheets in addition to paper may be used in a continuous laminate for this invention, for example, white opague thermoplastic sheets and metal foil sheets.

By using the continuous laminate, the clear edges of the encased laminate are eliminated, as explained above. The handling of numerous small strips in the laminating press is avoided and the large laminated sheet is simply die cut into the finished laminate strips ready for molding, without any waste. Furthemore, since the laminating is applied only to relatively large sheets, say 12 × 12 in., or 14 × 22 in. or larger, distortion is completely avoided. Thus, all the disadvantages of the encased laminate are overcome.

Continuous thermoplastic laminates per se, are of course not new. It is also well known that they are prone to delamination unless they are of the same thermoplastic material throughout. Furthermore, all thermoplastic materials, sheets, rods, tubes etc., that are thermoplastic throughout, are subject to creep, which causes the object to yield slowly under continued stress. For these reasons, anyone skilled in the art of plastics fabrication would naturally shy away from the use of a continuous laminate for this application to the slide rule pen.

Nevertheless, I have found after considerable experimentation that a very satisfactory continuous laminate that remains free from any delamination effects and is creep free and dimensionally stable when in use on the slide rule pen, can be made within certain critical ranges, if proper precautions are taken.

I have found that there are five critical factors leading to a satisfactory, paper core continuous laminate which are, the thickness of paper used, the thickness of overlay surface sheets, the diameter difference (that is, the difference between the inside diameter of the slide and the outside diameter of the pen), the total laminate thickness and finally the type of paper used. Obviously, with five variables many combinations are possible.

The paper should preferably be an 80 lb. Kromekote paper coated both sides. Other similar types of impregnated and coated mat surface papers sometimes referred to as enameled papers may also be used. The thickness in all cases should only be about 2 to 3½ mils and no more. Photoprints are not satisfactory. The thickness of overlay sheets should be about 8 to 10 mils and the finished laminate thickness about 18 to 24 mils. The D—D (diameter difference) should be about 5 to 8 mils.

In contrast to this, with the encased laminate any good laminating paper can be used as well as most photoprints, with thicknesses up to 6 to 12 mils. The thickness of overlay and total thickness is not critical and a very much wider usable range is possible for the encased laminate, by comparison.

A specific example of a preferred continuous laminate follows: A 12 × 12 in. sheet of 80 lb. Kromekote paper, coated both sides, and of 3¼ mils thickness is multi-printed with 40 slide rule prints accurately placed. The printed paper is then placed between two 12 in. sheets of clear vinyl of 10 mils thickness and laminated by the usual procedure. The laminated sheet is die cut into 40 strips which are molded to an I.D. of 0.293 inches, and placed on a pen with an O.D. of 0.300 inches, giving a D—D of 7 mils.

The sliding resistance of this slide is very satisfactory and remained so after 2 years of severe test usage.

There is no evidence of any delamination. The slide can even be submerged for 72 hours under water without any adverse effect.

For metal foil core sheet continuous laminates, I have found the same critical ranges of overlay sheets, total thickness and D—D, also apply. The foil thickness however, should be minimal, consistant with satisfactory handling in printing and laminating, say about 1 to 2 mils. The foil may be brass, aluminum or tin and is preferably coated with a white, dull mat finish baked enamel coating to provide a better base for printing and laminating. Other coatings used in the laminating industry for improving adherence of the thermoplastic surface sheets may also be used.

With the thermoplastic core sheet, the final continuous laminate will be thermoplastic throughout and should preferably be of the same thermoplastic material and I have found vinyl thermoplastic to be preferred from the post forming standpoint. In this case the relative thickness of core sheet and overlay sheets is not important but the total laminate thickness is critical as well as the D—D, in order to avoid creep. The total thickness range should be about 17 to 23 mils and the D—D about 6 to 9 mils.

The effects of creep were worked out by means of the following procedure. A preferred continuous vinyl laminate was made by multi-printing on white opaque vinyl sheet of 10 mils thickness and then surface over-laminating to a total thickness of 20 mils. The laminate was then die cut as in the case of the paper core laminate described above and the slide strips molded to an I.D. of 0.292 inches. This provided a springlike tension when placed on a pen with an O.D. of 0.300 inches, with a D—D of 8 mils. In order to change the slide tension in a series of tests the slides were placed on rods of different diameters and kept at an elevated temperature of 90° F. (for an accelerated test), for different periods of time. After the time period of the test had elapsed the slides were removed from the rods and placed on the pen, and the sliding resistance compared to that when placed on the pen before the test. The results are given in the following table.

TABLE

| Test | Diameter Difference between slide and rod. | Time Period. | Result when slide is placed on pen. |
|---|---|---|---|
| 1 | 8 mils | 3 mos | No measurable diff. in sliding resis. after 3 mos. |
| 2 | 15 mils | 3 mos | No measurable diff. |
| 3 | 20 mils | 3 mos | No meas. diff. |
| 4 | 30 mils | 3 mos | Slight decrease in sliding resis. |
| 5 | 40 mils | 3 mos | Small decrease in sliding resis. |
| 6 | 50 mils | 48 hr | No meas. diff. |
|   |         | 3 mos | Slide loose after 3 mos.- Inoperable. |
| 7 | 60 mils | 24 hrs | No meas. diff. |
|   |         | 1 mo | Loose - Inoperable. |
| 8 | 70 mils | 10 min | No meas. diff. |
|   |         | 1 hr | Loose - Inoperable. |
| 9 | 80 mils | 48 hrs | Falls off pen. |

From the above results it becomes apparant that the creep factor becomes excessive and increases rapidly with increased tension beyond the tension caused by a D—D of 30 mils, with this particular laminate and thickness.

Moreover, the creep factor becomes negligible below the tension caused by a D—D of 15 mils, with this particular laminate and thickness. There is no measurable difference in sliding resistance in 3 mos. under this accelerated test. I have found that this particular laminate with a D—D of 8 mils under normal conditions of temperature and usage still remained dimensionally stable and creep-free after more than 2 years with no measurable difference in sliding resistance, and this is regarded as being creep-free for all practical purposes for this application.

Once a workable, creep-free combination has been achieved by the above unique and simple procedure, other creep-free combinations based on the same stress intensity can easily be explored in like manner. For example, a somewhat thicker laminate with a somewhat smaller D—D, or a somewhat thinner laminate with a somewhat larger D—D, which will provide similar stress intensity. However, as the laminate becomes thinner it tends to become weak and flimsy and as it becomes thicker it tends to become too rigid. I have found a good general thickness and D—D to be that of the preferred Vinyl laminate used in the above test procedure.

I have further found that it is possible to extend the usable thickness range to a thinner laminate by a very slight, very beneficial modification of the continuous laminate slide. This is very sinply accomplished by bringing the ends of the molded slide against a hot surface whereby the edge is softened and flows slightly forming a very slight flange. This is of course done with the slide on a rod of the same diameter as the ID of the slide so as to prevent any restriction and diameter change at the slide ends. The exact cross section of the minute flange is unimportant and anyone familiar with plastics fabrication will be able to produce a satisfactory result by the above method.

A flange projection of only 10 mils which is hardly noticeable will already help to stiffen a flimsy slide and it can be made somewhat larger if desired. This slight modification will also help the cling of the slide to the pen when the slide is pulled out toward the end of the pen. It will also tend to equalilze the sliding resistance toward the end of the pen and finally, the slight projection will act as a stop to prevent the indicator from being pulled off the ends of the pen. And this beneficial modification applies equally well to all continuous laminates including, paper, thermoplastic and metal foil core laminates.

Obviously, in the continuous laminate in which both core and surface overlay sheets are of the same thermoplastic material, for example vinyl, it is possible to use only one overlay surface sheet with satisfactory results. In this case the thickness of the single surface overlay sheet would be such that the total thickness of the laminate would be the same as when using two surface sheets, and it would naturally be applied to the printed surface of the core sheet to protect the printing.

Having noted some drawbacks to the encased laminate and having shown how these disadvantages can be eliminated by using a continuous laminate, and having shown how the continuous laminate can be made free from delamination, creep-free, and free from the effects of moisture and other deteriorating agents so that anyone skilled in the art can produce a satisfactory, workable continuous laminate using various combinations of core and surface sheet materials, I now wish to claim the use of the continuous laminate in the application of the multi-scale slide rule pen described.

In the following claims, dimensionally stable, means that the diameter of the laminate slide remains constant under normal usage on the slide rule pen.

Creep-free means that the laminate slide will remain substantially free from any adverse effects of creep on its sliding resistance under continued normal usage on the slide rule pen.

Delamination-free means that the laminate will show no evidence of delamination under normal usage on the pen.

Thermoplastic is intended to cover any thermoplastic material such as vinyl, cellulose acetate, cellulose acetate butyrate, polyester, etc. normally used in the laminating art.

Continuous laminate is defined in the specification and is intended to cover any clear thermoplastic overlay sheet material normally used in the laminating industry along with any suitable paper, metal foil or thermoplastic core sheet material as described in the specification.

I claim:

1. In a multi-scale slide rule pen in which a post molded thermoplastic laminate covers the surface of the pen and in which the laminate is in the form of two longitudinal strips, a narrow one attached to the pen, and a wider one, the laminate slide, which slides along the pen and has a segmental tubular form, the improvement comprising the use of a continuous laminate as the surface layer of the pen, said continuous laminate having a total thickness of 17 to 24 mils and a rigidity suitable for molding to the curvature of the pen, said continuous laminate being comprised of a printed laminating core sheet selected from the group consisting of paper, metal and thermoplastic, said continuous laminate comprising further, clear, thermoplastic overlay sheets selected from the group consisting of vinyl resin, cellulose acetate, cellulose acetate butyrate and polyester said continuous laminate being free of any delamination, and free of any distortion of the scale printing on the laminate, said laminate slide, having a diameter when removed from the pen of 5 to 9 mils less than the diameter of the pen, said laminate slide being under constant spring-like tension on the pen due to the diameter difference between the slide and the pen, said laminate slide having a constant sliding resistance on the pen suitable for satisfactory slide rule operation, and said laminate slide having a rigidity suitable for satisfactory slide rule manipulation.

2. The improvement as claimed in claim 1, in which the core sheet of the continuous surface laminate is a printed, opague vinyl laminating sheet of the type normally used for making printed, fusion bonded, thermoplastic sheet laminates in laminating presses, and in which the overlay sheets of the continuous surface laminate are clear, vinyl overlay sheets and in which the total thickness of the continuous surface laminate is 17 to 23 mils, and in which the laminate slide has a diameter of 6 to 9 mils less than the diameter of the pen, and in which the laminate slide has hardly noticeable flanged ends that project outward about 10 mils.

3. The improvement as claimed in claim 1, in which the printed core sheet is 80 lb. kromkote paper coated both sides, said core sheet having a thickness of 2 to 3½ mils, and in which the overlay sheets of the continuous surface laminate are clear, vinyl overlay sheets and in which the total thickness of the continuous surface laminate is 18 to 24 mils, and in which the thickness of the overlay sheets is 8 to 10 mils, and in which the diameter of the laminate slide when removed from the pen is 5 to 8 mils less than the diameter of the pen.

* * * * *